(12) United States Patent
Schaller et al.

(10) Patent No.: US 10,343,197 B2
(45) Date of Patent: Jul. 9, 2019

(54) PIG SEGMENT AND PIG

(71) Applicant: Rosen Swiss AG, Stans (CH)

(72) Inventors: Daniel Schaller, Lucerne (CH); Sergei Filippovitch, Richmond Hill (CA); Daniel Vogler, Lungern (CH); Frank Fielers, Lingen (DE)

(73) Assignee: Rosen Swiss AG, Stans (CH)

( * ) Notice: Subject to any disclaimer, the term of this patent is extended or adjusted under 35 U.S.C. 154(b) by 665 days.

(21) Appl. No.: 14/899,778

(22) PCT Filed: Jun. 4, 2014

(86) PCT No.: PCT/EP2014/001502
§ 371 (c)(1),
(2) Date: Dec. 18, 2015

(87) PCT Pub. No.: WO2014/202186
PCT Pub. Date: Dec. 24, 2014

(65) Prior Publication Data
US 2016/0136700 A1    May 19, 2016

(30) Foreign Application Priority Data
Jun. 19, 2013    (DE) .......................... 10 2013 106 424

(51) Int. Cl.
*F16L 55/32*    (2006.01)
*B08B 9/051*    (2006.01)

(52) U.S. Cl.
CPC .............. *B08B 9/051* (2013.01); *F16L 55/32* (2013.01)

(58) Field of Classification Search
CPC ............ H02G 1/06; H02G 1/08; H02G 1/081; H02G 1/083; H02G 1/085
See application file for complete search history.

(56) References Cited

U.S. PATENT DOCUMENTS 3,746,026 A    7/1973   Herring
3,942,560 A *  3/1976   Deaver ............... F16L 55/1283
                                               137/1

(Continued)

FOREIGN PATENT DOCUMENTS

DE    2756561 A1    6/1979
DE    9319684.9 U1   6/1995

(Continued)

OTHER PUBLICATIONS

International Search Report dated Sep. 26, 2014 (PCT/EP2014/001502).

*Primary Examiner* — Lee D Wilson
(74) *Attorney, Agent, or Firm* — Alix, Yale & Ristas, LLP

(57) ABSTRACT

A pig segment for actively propelling a pig in elongated hollow bodies, preferably in gas and oil pipelines. The segment includes a drive comprising at least one motor, at least one supporting element by which the pig segment can be supported on an inner surface of the hollow body, and at least one bearing element that is movable along a longitudinal axis of the pig segment by the motor. The supporting element is pivotably arranged on the bearing element such that the supporting element can adopt a supporting position In the supporting position, a supporting force is produced relative to a force exerted on the bearing element in a longitudinal direction. The invention also relates to a pig with a pig segment of this type.

22 Claims, 5 Drawing Sheets

(56) References Cited

U.S. PATENT DOCUMENTS

| | | | | |
|---|---|---|---|---|
| 4,645,149 A | * | 2/1987 | Lowe | A63B 29/024 248/231.9 |
| 6,190,090 B1 | * | 2/2001 | Campbell | B08B 9/0551 15/104.061 |
| 6,427,602 B1 | * | 8/2002 | Hovis | F16L 55/34 104/138.1 |
| 6,752,175 B1 | * | 6/2004 | Willschuetz | F16L 55/16455 138/90 |
| 6,944,902 B1 | * | 9/2005 | Richter | B08B 9/0551 15/104.061 |
| 7,617,558 B2 | * | 11/2009 | Boe | B08B 9/049 15/104.061 |
| 7,954,575 B1 | * | 6/2011 | Bloxsom | H02G 1/088 104/138.1 |

FOREIGN PATENT DOCUMENTS

| | | |
|---|---|---|
| WO | 9404864 A1 | 3/1994 |
| WO | 02070943 A2 | 9/2002 |
| WO | 2005061944 A1 | 7/2005 |
| WO | 2005084833 A1 | 9/2005 |

* cited by examiner

PIG SEGMENT AND PIG

BACKGROUND

The present invention relates to a pig segment for the active advance of a pig in, in particular, elongate hollow bodies, preferably in gas and oil pipelines, with a drive which comprises at least one motor, at least one supporting element via which the pig segment can be supported on an inside of the hollow body, and a carrying element which is movable by the motor along a longitudinal axis of the pig segment. Furthermore, the invention relates to a pig comprising such a pig segment.

Larger industrial plants contain a multiplicity of different pipes and pipeline connections which typically, in addition to running horizontally, also run in a direction perpendicular to the underlying surface or in an arcuate manner with components in a direction perpendicular to the underlying surface. These elongate hollow bodies, which are generally circular or approximately circular in cross section, but may also have sections with polygonal cross sections, have to be maintained and optionally renovated from time to time, and therefore inspection devices in the form of cleaning or inspection pigs are sent through the pipes at intervals. In the absence of a working medium, such as, for example, gas, water or oil, the pigs have to be moved actively through the elongate hollow bodies.

DE 697 23 791 T2 shows a pig segment according to the precharacterizing clause of claim 1, in which the supporting element is extendable via a first motor and independently of the further motor, which is provided for the advance of the pig along a longitudinal axis. The supporting forces with which the pig can be supported against the pipe wall are limited by the construction used and are dependent on the motor which can push a wedge against a guide roller. In the most unfavorable case, this may result in the support beginning to slip in the case of pipe sections running vertically or perpendicularly and in particular with simultaneous curvatures when the friction of further parts of the pig that bear against the inner wall of the pipe result in increased shearing forces or when heavy loads are to be pulled through the pipe.

SUMMARY

It is therefore the object of the present invention to design a pig which is movable actively in an elongate hollow body, in particular in a pipeline, to be more secure against slipping in the hollow body.

This object is achieved by the subject matter as claimed in claim 1 and by the subject matter as claimed in claim 18. Advantageous refinements of the invention can be gathered from the dependent claims, which refer back thereto, and from the description below.

According to the invention, it is provided that the supporting element is arranged pivotably on the carrying element in order to take up a supporting position and, in the supporting position, a supporting force arises as a function of a force exerted in the longitudinal direction on the carrying element. At the moment at which a load acts in the longitudinal direction, i.e. in the direction of a longitudinal axis of the pig segment or of the pig and, by the latter on the carrying element, a supporting force is automatically produced via the supporting element which is pivoted outward away from the longitudinal axis. Said force arises as a resulting component (directed perpendicularly to the longitudinal axis and to the inside of the pipe) of the force which is directed from the pivot axis, or from the pivot bearing, in the direction of the lateral bearing of the supporting element on the inner surface of the hollow body. Bearing here means a point which arises as a resulting engagement point of the forces transmitted from the supporting element to the supporting surface on the inside of the hollow body. An angle between the force exerted on the carrying element and the force exerted from the pivot bearing to the bearing is preferably smaller than or identical to 90° here.

In a simplifying manner, instead of the hollow body, the starting point below is also a pipe, for example a pipe of a gas or oil pipeline, with a substantially circular cross section. However, other elongate hollow bodies may also be involved, for example hollow steel girders to be investigated.

The supporting element is preferably designed in such a manner that an angle $\beta \leq 90°$ is formed between a straight line drawn from the pivot axis to a possible supporting point, i.e. a bearing point in a possible supporting position of the pivot element, and a straight line running from the pivot axis parallel to the direction of movement of the carrying element. The supporting element is therefore arranged on the carrying element in such a manner that a preferred direction directed counter to the supporting force or the support arises. By means of support against the supporting element and the carrying element, part of the pig segment can be pushed along, whereas, in the event of loading of the carrying element in the other direction, the supporting elements may be entrained and slipping on the inside of the pipe may arise.

The pivot bearing results in lateral support, and a force component arising from a load exerted on the carrying element acts in a direction perpendicular to the surface of the inside of the hollow body. A separate drive for the application of a sufficient supporting force, as in the prior art, is not necessary.

By means of the support on the pipeline or on the pipe/hollow body, the non-fixed part of the pig segment can move along the carrying element and, driven by the drive, in the appropriate direction. The carrying element typically moves in a guide, and therefore the latter moves relative to the carrying element in the supporting position. The supporting element or supporting elements can subsequently preferably be transferred into a pulled-back position, i.e. non-supporting position. In this position, the carrying element can be moved with the supporting element or the supporting elements in an associated guide of the pig segment in order to be transferred into the starting position for pivoting out the supporting elements. By means of the subsequent pivoting out of the supporting elements and the support and optionally simultaneous displacement again of the rest of the pig segment, the entire pig segment, or the pig, is gradually pushed along.

In order to achieve a symmetrical support on the wall and to prevent tilting of the pig segment during the support, a pig segment according to the invention preferably has two or more supporting elements, by means of the support of which the pig is oriented in particular in the center of the pipe. In the case of two supporting elements, the latter lie opposite each other in particular with respect to a longitudinal axis, which corresponds to a longitudinal center axis of the pig or of the pig segment, and are offset by 180° in the circumferential direction. In the case of three supporting elements, the latter are correspondingly offset by 120° in the circumferential direction.

In the case of a pig segment with one supporting element or with two mutually opposite supporting elements, the pig can be moved in pipes running horizontally. By alternate stopping and moving of two pig segments operating in an alternating manner, a pig can be moved in a direction perpendicular to the underlying surface counter to gravitational force and, in the process, can additionally draw loads, for example measuring instruments, after it. The tensile force or the force which acts in the longitudinal direction on the carrying element is directed counter to the desired movement.

The supporting element is in particular designed in such a manner that the supporting force is at least substantially, in particular, of course, completely proportional to the tensile force or the force which arises by means of the drive and/or by means of a load, including the weight, to be moved by the pig segment. The ratio of supporting force to tensile force which arises on the carrying element via the drive or else via weight or friction and attached loads is at least approximately constant. Higher loads result in greater pressing-on or supporting forces, and therefore a pig which is equipped with a pig segment according to the invention is capable of transporting weights which amount to a multiple of the dead weight of the pig through a pipeline and counter to gravitational force. By increasing the supporting force with which the supporting element presses against the inside of the pipe, the friction is increased and, unlike in the prior art, the pig does not slip in the pipeline.

In a development according to the invention, the supporting element of the pig segment has a shape, by means of which the supporting force is proportional to the force $F_{carrying}$ which acts on the carrying element and arises by means of the motor and/or a load to be moved by the pig segment. In particular, the supporting force is $F_{supporting} \sim F_{carrying}/(\tan \alpha)$, wherein $\alpha$ is the angle between a straight line drawn from the pivot axis to a supporting point and a straight line running from the pivot axis perpendicular to the inside of the pipe. The angle $\alpha$ is smaller than or equal to 90°. The angle $\alpha$ is preferably between 5 and 30°, particularly preferably between 10° and 25°. At these angles, significant supporting forces which are of a sufficient size in order to move even heavy pigs through the pipeline arise.

The supporting element is mounted pivotably in the carrying element. The supporting element may be of multi-part design, but it is essential that the supporting element is supported on the inside of the elongate hollow body in the supporting position.

As an alternative or in addition to transferring the supporting element into a pulled-back position, the pig segment can be provided with a force accumulator element which is arranged in particular on the carrying element and on the supporting element and pushes the supporting element outward from the longitudinal center axis, which corresponds to the longitudinal axis of the pig. By means of the pivoting movement, part of the supporting element is shifted in the radial direction. By means of the force accumulator element, contact between the inner wall of the pipe and the supporting element is maintained and the supporting element does not have to be transferred first into the supporting position, in particular at the beginning of the displacement of the rest of the pig segment. During the further movement operation, in which the carrying element is pulled behind, the supporting element can be moved by means of the drive in contact with the pipe in the direction of the forward movement since a supporting force does not act here (apart from the force which is applied by the force accumulator element and is negligible) and the supporting element slides along the inside of the pipe. It can be assumed in this connection that the friction between the rest of the pig segment and the pipe is greater than the friction between the supporting element and the pipe.

Although more complex mechanisms for transferring the supporting element into an outwardly set position may be conceivable, for example as a function of the drive, the use of a force accumulator element, such as, for example, a spring, is advantageous since transfer into a supporting position takes place independently of the drive. Automatic adaptation of the supporting element to changed inside diameters of the pipe takes place.

In an advantageous manner, the carrying element is transferrable forward out of a position, in which the supporting element is transferrable into the supporting position, along the longitudinal axis into a freewheeling position, in which the supporting element pivots onto the longitudinal axis. In particular, the supporting element here can run against a pivoting cam, a pivoting roller or another component which brings about a pivoting movement of the supporting element onto the longitudinal axis and therefore a retraction of the supporting element. This component should therefore be spaced apart in the radial direction in particular further from the longitudinal (center) axis than the pivot axis of the pivot bearing of the supporting element. The movement which can be carried out by the carrying element along the longitudinal axis is preferably divided here into a portion for the advance of the pig segment and into a portion for the transfer into the freewheeling position, wherein the division can be undertaken in particular as a function of the shape of the supporting element/supporting elements. The division is preferably at 50:50, as also in the exemplary embodiment described below.

The transfer into the freewheeling position is advantageous in particular in the event of the pig segment or of the pig jamming. In the case of a blockage, the rest of the pig segment may no longer be able to be moved forward relative to the carrying element. In order to permit a backward movement out of said position, in which the supporting element or the supporting elements is or are also blocked, the carrying element can then be moved forward, as a result of which the supporting elements are released.

Guide elements are preferably arranged in front of and behind the supporting means, the guide elements opposing a tilting of the pig segment in the hollow body and, in particular in a position in the hollow body in which the longitudinal center axis of the pig is at an angle to the longitudinal axis of the hollow body, friction between the pig segment and the hollow body being minimized. Guide elements can also be arranged in the circumferential direction of the pig segment between the supporting elements, said guide elements, specifically in the case of tight bends, minimizing the friction between parts of the pig and of the pipe wall that are undesirably in contact.

In order to achieve optimum support of the supporting element and to prevent the supporting element from slipping even at more unfavorable angles with respect to the pipe wall, the supporting element should preferably be provided with an outwardly directed surface which is of friction-increasing design. This may involve, for example, teeth, points or similarly acting means formed on the surface. As an alternative and also in addition, the surface can be provided with a coating or can be roughened. In order to avoid damage to an inside of the pipe wall, it is also in particular possible to use a combination of a surface which is provided with a coating, for example of polyurethane, and has teeth, wherein the teeth only act in engagement with the wall and accordingly in a friction-increasing manner if the coating is pressed in by the action of a force of a predefinable size to the extent that the teeth consisting of the material can enter into engagement with the wall.

The outwardly directed surface here means a surface which is directed away from the longitudinal axis/longitudinal center axis in the radial direction. However, a normal of the surface does not have to be perpendicular to the longitudinal axis, but merely points away therefrom. This surface is oriented in the hollow body toward the inside surface of same.

The supporting element is preferably provided with a surface which is directed away from the longitudinal center axis and itself, or the envelope thereof, is curved, wherein the curvature preferably varies. An envelope here means an envelope which is provided without sharp edges and, for example, includes possible teeth on the outwardly directed surface. The curvature results in a preferably similar ratio between tensile and supporting forces being maintained as far as possible independently of the inside diameter of the pipe. For example, sections of the outer surface of the supporting element may be in the shape of a spiral of Archimedes or a logarithmical spiral shape in order simply to keep the ratio approximately constant.

The supporting element can furthermore be of substantially crescent- or sickle-shaped design and can optionally be provided with a previously described surface in order to ensure good support of the forces to be transmitted.

In particular when two mutually opposite supporting elements are used, it is advantageous if the carrying element is arranged centrally in the pig segment such that this already results in a symmetrical division on both sides of the forces bearing against the carrying element. The carrying element itself can be guided in a guide or on a guide, for example on a threaded rod. Use of a threaded rod provides a simple possibility firstly of moving the carrying element in the longitudinal direction by rotation of the threaded rod and secondly of absorbing the forces present in the supporting position even without movement.

Precise and simple guidance of the carrying element is realized if the carrying element is arranged exclusively in a longitudinally movable manner in the pig, i.e. can be moved in the longitudinal direction of the pig segment in and counter to the direction of movement of the entire pig.

However, it may also be advantageous to arrange the carrying element in the pig so as to be rotatable and longitudinally movable at least with one component in the direction of the longitudinal axis. By means of such an arrangement of the carrying element and, in particular, by designing the carrying element at the same time as a disk-shaped carrying element with a plurality of supporting elements arranged along the circumference thereof, a continuous movement of the pig in the pipeline is possible, with an intermittently built-up progressive manner of movement being dispensed with. In a different manner than, for example, in the case of pigs with motor-driven wheels, via which support on the pipeline wall takes place at the same time, each carrying element here is assigned a plurality of supporting elements which are arranged pivotably on the carrying element. Each of the supporting elements results in the previously described formation of the supporting force.

This continuous movement is achieved in particular in that a corresponding pig segment has two carrying elements having an identical axis of rotation, wherein the supporting elements of the two carrying elements are arranged offset with respect to one another in the circumferential direction with respect to the axis of rotation in such a manner that said supporting elements pass in an alternating manner from one carrying element to the next carrying element into the supporting position with an inside of the hollow body.

Such pig segments which are equipped with carrying elements provided, for example, in the form of rotary disks are advantageously developed in particular if, for the symmetrical division of the forces, in each case one or else two rotary disks are equipped with further rotary disks provided on an opposite side with respect to the longitudinal axis.

The carrying element of a pig segment according to the invention is preferably drivable in terms of drive via a threaded rod connected to a motor. This already results in a simple possibility of reducing a rotational speed exerted by the motor in order to be able to exert higher forces on the carrying element. The motor is activatable via an associated control device which controls the movement of the pig segment.

In order to increase the protection against failure and also in order to exert a higher force on the supporting element, a further motor can be provided for the simultaneous drive of same threaded rod.

Furthermore, the threaded rod can be connected to the motor or the motors via an additional gearing in order to be able to apply the required forces even more specifically. The disadvantage of slower progression of the carrying element along the longitudinal axis is made up for by the increase in the available advancing force.

An advantageous use of the available construction space for a preferably substantially cylindrical design of a pig is provided if the supporting element is guided via a hollow body in which the motor or one of the motors is arranged. The motors can be hydraulic or electric motors. For the autonomous energy supply, an associated pig preferably has an energy accumulator which is carried along in the pig segment or in the associated pig.

The object set at the beginning is likewise achieved by a pig which has partially also already been previously described and has one of the pig segments previously described or described below.

Such a pig is preferably provided with two pig segments, wherein the pig has at least one control device via which the supporting elements of one pig segment in each case are movable alternately to those of the other pig segment. The control device is preferably part of the pig. However, for less autonomous pigs and also for a current supply remote from the pig, the control device can be connected to the pig via cables.

As previously described, a pig segment is provided with a preferred direction which corresponds to the direction of movement of the pig segment and is directed counter to the force acting on the carrying element. The pig segment or the associated pig therefore pushes forward on the inside of the pipe. By means of the consecutive connection of two pig segments with an identical direction of movement and the alternating operation thereof, it is possible also to move the pig segments which are connected to one another upward perpendicularly in a pipe counter to gravitational force.

In a further exemplary embodiment according to the invention, the consecutive connection of two pig segments in the opposite direction, i.e. with opposed preferred directions, results in the pig or the combination of the two pig segments being able to move in a horizontal direction into a pipe and out again therefrom. Accordingly, the consecutive connection of four pig segments or the equipping of an individual pig segment with then correspondingly at least two supporting elements acting in an opposed manner in each case results in an associated pig or the combination of the pig segments then being able to move forward and back and in each case also in the vertical direction opposite to gravitational force. For example, it is thus possible to travel in both directions through the limbs of U-shaped pipe sections.

BRIEF DESCRIPTION OF THE DRAWINGS

Further advantages and details of the invention can be gathered from the description below of the figures together with exemplary embodiments. In the schematic images of the figures.

DETAILED DESCRIPTION

Individual technical features of the exemplary embodiments described below can also be combined with previously described exemplary embodiments and with the features of the independent claims and possible further claims to form the subject matter according to the invention. If expedient, functionally identically acting elements are provided with identical reference numbers.

Figure 1:
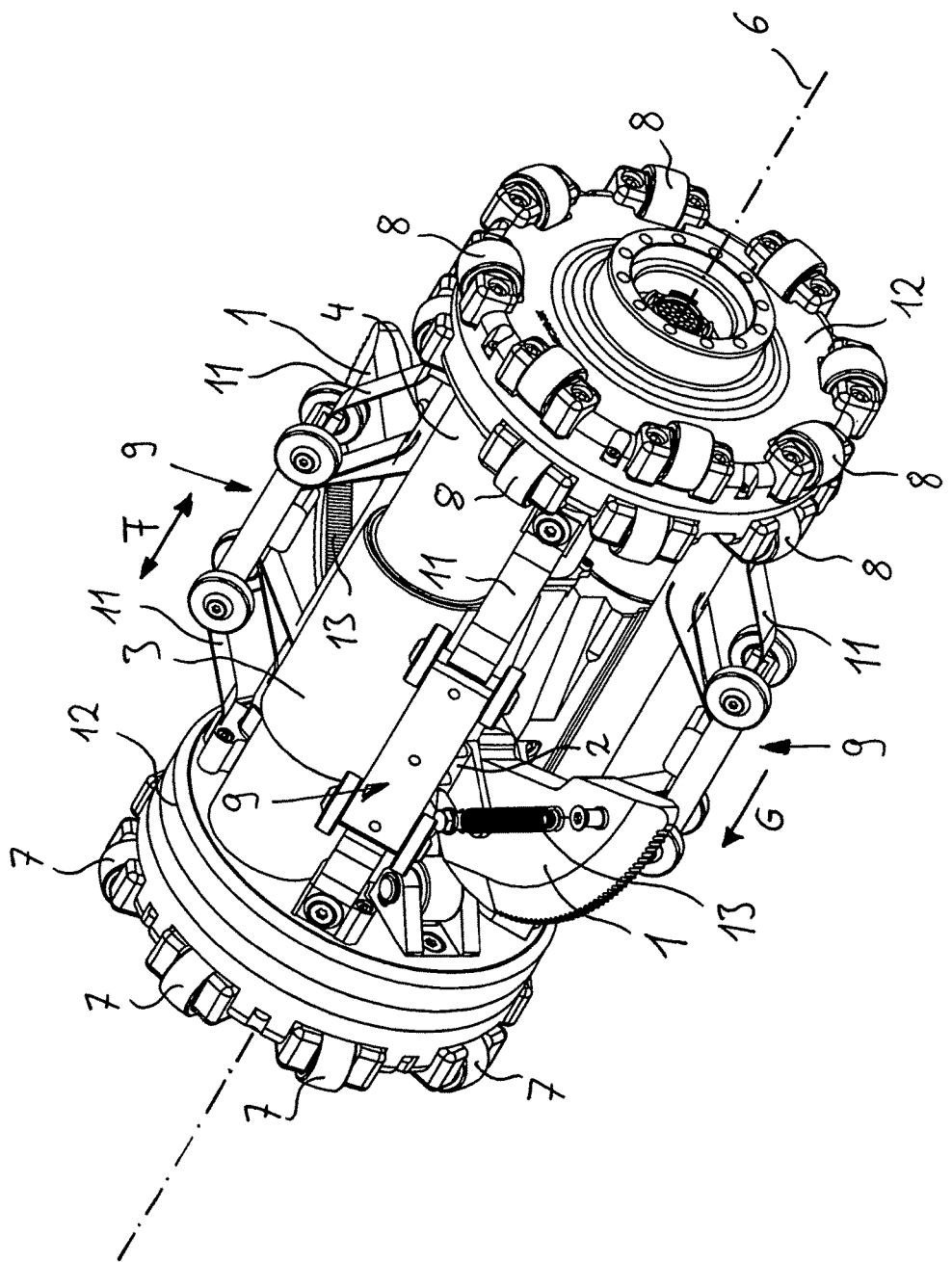
FIG. 1 shows the subject matter according to the invention in a perspective view.

A novel pig segment according to FIG. 1 has two mutually opposite supporting elements 1 which are arranged pivotably on the same central carrying element 2 (cf. FIG. 2) and which can be transferred into a supporting position in contact with an inside 5 of a tubular hollow body 10.

Figure 3:
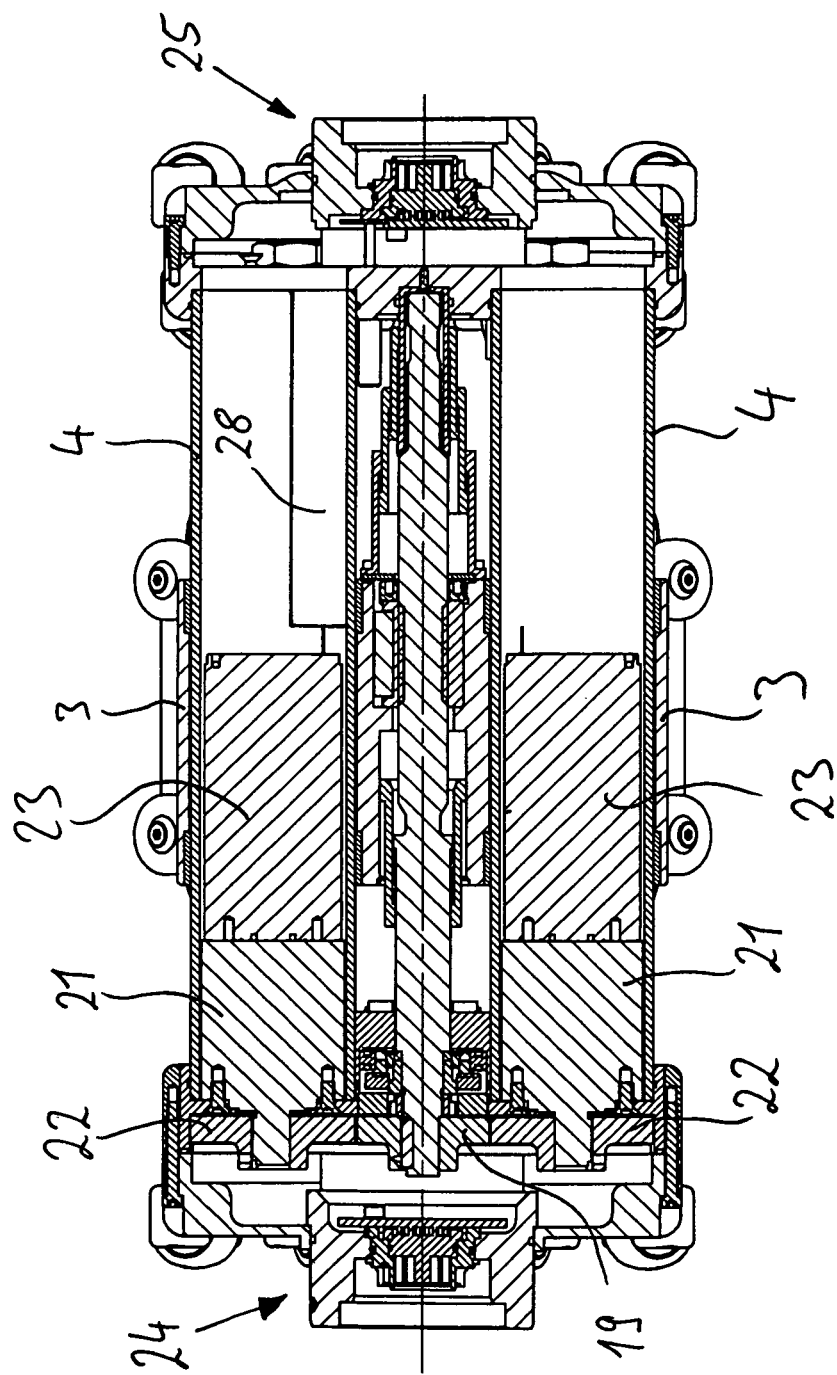
FIG. 3 shows the subject matter according to FIG. 2 in a section offset by 90°.

The carrying element 2 is arranged centrally but, via two guide sleeves 3, is supported and guided decentrally on two hollow bodies 4 designed as hollow cylinders (cf. FIG. 3). The hollow cylinders 4 for their part are in turn arranged symmetrically with respect to a longitudinal axis 6, wherein the carrying element 2 is movable along its guide in the direction(s) of the double arrow F. The direction of movement and preferred direction of the pig segment corresponds to the direction of the arrow G. At the front end of the pig segment with respect to said direction of movement there is a multiplicity of guide elements 7 which are arranged in the circumferential direction about the longitudinal axis 6 and are in the form of rollers which, when the pig segment is angled together with the guide elements 8, which are located at the rear end and are likewise designed as rollers, are intended to avoid tilting of the pig segment. The supporting elements are assigned corresponding receptacles and holders via which said guide elements are held on the pig segment body.

In addition, further spring-loaded guide elements 9 are arranged in the circumferential direction about the longitudinal axis between the supporting elements 1, said guide elements each having four rollers on a carrying body, said rollers in turn being held on pig segment bodies 12 via leaf springs 11. Said additional guide elements 9 prevent the pig, when travelling through bends, from attaching itself to the pipe wall on the inside of the bend and becoming wedged there.

Force accumulator elements 13 in the form of springs push the supporting elements outward away from the longitudinal axis 6, which corresponds to the longitudinal center axis.

The supporting elements 1 have an approximately crescent shape which is initially curved to a more pronounced extent on a side on which a pivot bearing 14 is arranged, and then peters out. This gives rise to a profile corresponding approximately to a logarithmical spiral when contemplating the teeth 16 of the supporting elements with adjacent envelopes of an outer surface 17. This has the effect that a force $F_{carrying}$ which acts on the pivot bearing 14 in the direction of the longitudinal axis 6 brings about a supporting force $F_{supporting}$ in a direction perpendicular to the longitudinal axis 6 and therefore in the direction of the pipe wall and also perpendicularly thereto.

Figure 2:
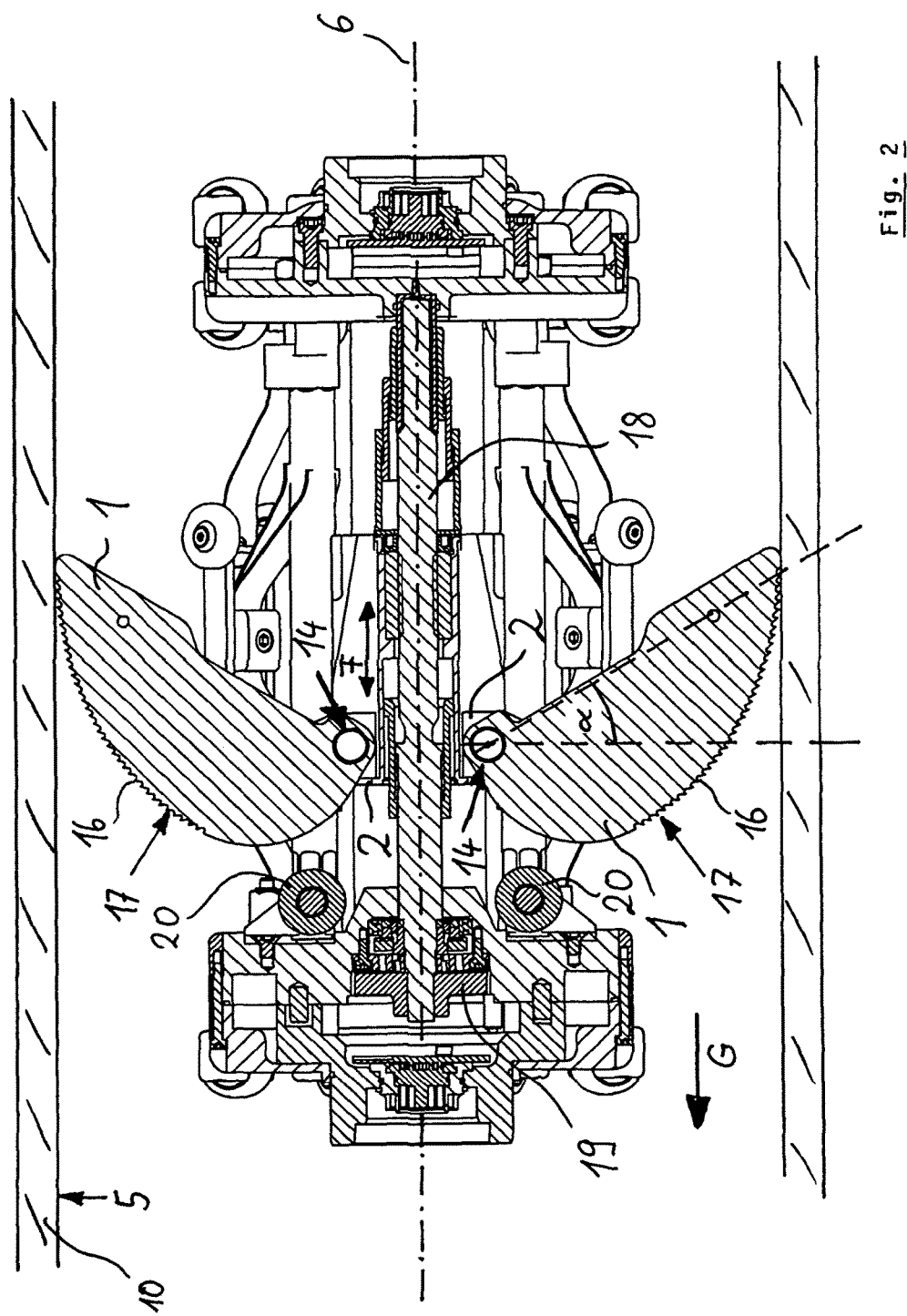
FIG. 2 shows the subject matter according to FIG. 1 in a section along the supporting elements.

In the event of a curvature of a surface which corresponds to a logarithmical spiral, the ratios of tensile forces on the carrying element to supporting forces perpendicular to the longitudinal axis and therefore also perpendicular to the pipe wall are approximately identical. The supporting force acting in the direction of the inner wall of the pipe and perpendicularly to the longitudinal center axis 6 is proportional to the force acting on the carrying element 2 in the longitudinal direction divided by the tangent($\alpha$) of the angle between the perpendicular to the longitudinal center axis and a line between the pivot axis and the supporting point on the inner wall of the pipe ($F_{supporting} \sim F_{carrying}/(\tan \alpha)$). In FIG. 2, said supporting point is pivoted about the angle $\alpha$ by scarcely 30° from the perpendicular to the longitudinal center axis 6. The intersecting point of the two angular limbs is the pivot axis of the supporting element 1.

The longitudinal center axis is at the same time also the axis of rotation of a threaded rod 18 which meshes via a thread with the carrying element 2 and can move the latter in the direction F. Said threaded rod is driven via a gearing which is located at the front in the direction of travel and has a spur gear 19 which is driven by two motors arranged in the hollow bodies 4, which are in the form of hollow cylinders.

Further spur gears 22 which mesh with the spur gear 19 are arranged between the motors 21 and the spur gear 19. Energy accumulators 23 serve for the autonomous energy supply of the pig or of the pig segment. A control device for the forward movement, which takes place in an intermittent manner, of the pig segment is not illustrated specifically. The pig segment illustrated in FIG. 3 is at the same time also a fully formed pig which can be connected to further pig segments via connections 24 and 25 and can carry along possible loads therewith. The connections 24 and 25 typically have threads for the screw connection of possible further pig segments and also contacts for connection to control electronics or for supplying energy.

In order for pushing along in the direction G to be achieved, the supporting elements have to be in the supporting position and connected to the inner wall of the pipe (FIG. 2). By means of a load on the carrying element in a direction counter to the direction G, i.e. to the rear, the pig becomes wedged in the pipe, and that part of the pig segment which relates to the non-supporting elements and carrying elements is pushed forward in the direction G via the rotation of the threaded rod. The sequence of movement is controlled via a control device 28, which can also be positioned at a different location in the pig. In order to reach the freewheeling position with supporting elements 1 pivoted in the direction of the longitudinal axis, the carrying element 2 can move further forward in the direction G from the position shown in FIG. 2, in particular in the event of a blockage of the pig, and therefore pivoting rollers 20 press the outer supporting elements in the direction of the longitudinal axis 6.

Figure 4:
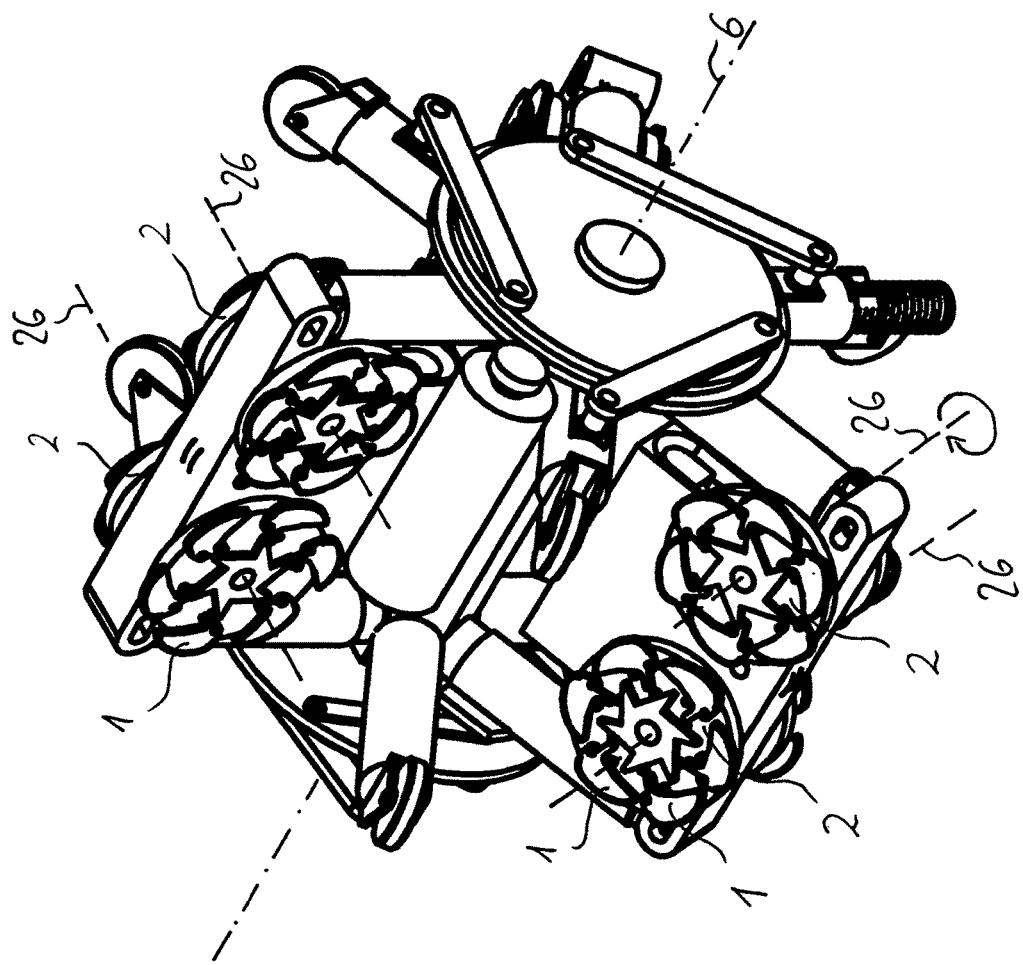
FIG. 4 shows the further subject matter according to the invention.
Figure 5:
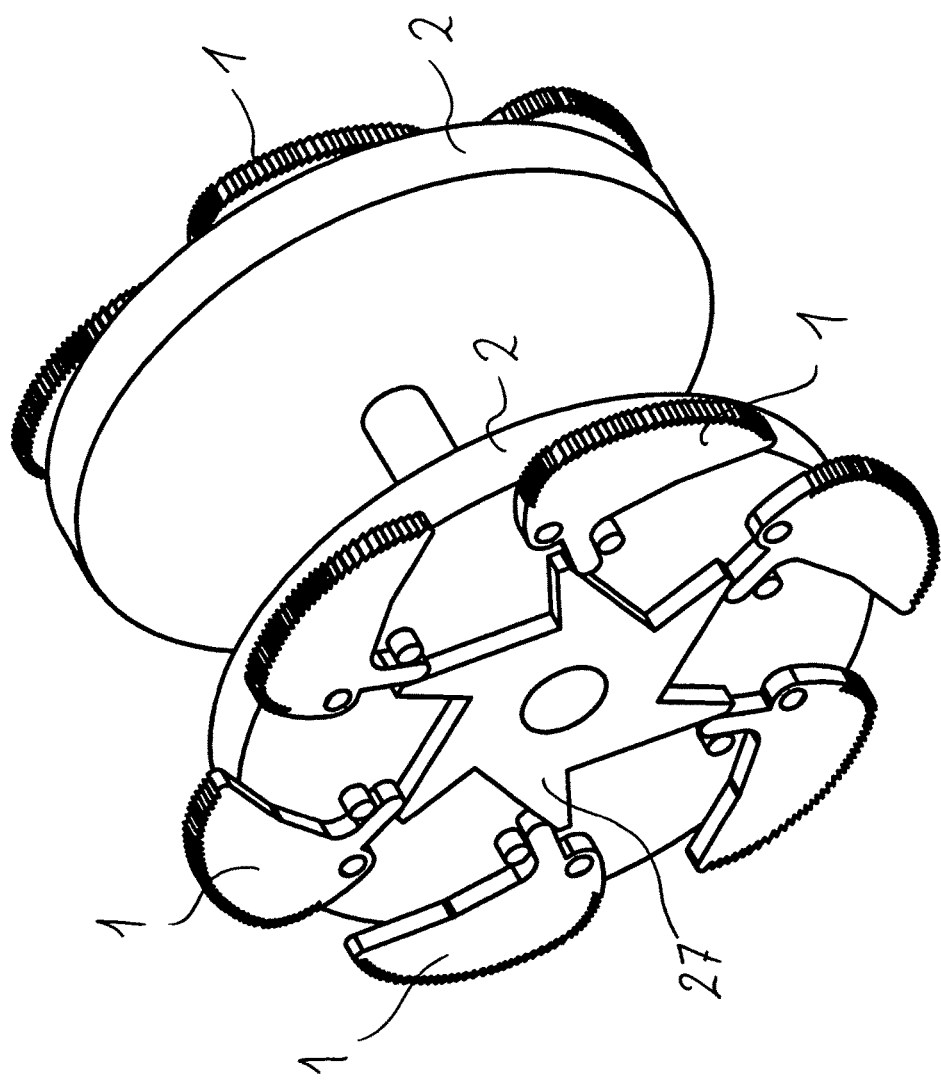
FIG. 5 shows a detail of the subject matter according to FIG. 4.

In the exemplary embodiment according to FIG. 4, twelve disk-shaped carrying elements 1 which are rotatable about axes 26 are arranged in the circumferential direction about a longitudinal center axis 6. By means of the in particular synchronous rotation of the carrying elements about the axes 26, the supporting elements 1 which are designed in accordance with the supporting element according to the first exemplary embodiment and of which each disk-shaped carrying element has six pieces in the circumferential direction about the axis of rotation 26 come alternately into engagement with a pipe wall. Each supporting element 1 is arranged pivotably on the carrying element 2 and, by means of the movement component of the carrying element in the direction of the longitudinal center axis 6, some of the force exerted by the carrying element is used or produced for supporting the pig segment on an inner wall of the pipe. Via a star-shaped actuating element 27 (FIG. 5) which is assigned to each carrying element, the supporting elements can be pivoted about the pivot axis thereof and therefore brought into a supporting position or released therefrom.

With regard to the forces transmitted by the supporting elements 1 of the further exemplary embodiment to the inner wall of the pipe, the same applies as for the previous exemplary embodiment. Said supporting elements in turn are also provided with a surface which is directed outward at least in the supporting position and which corresponds to a curvature analogous to the supporting element of the previous exemplary embodiment.

The invention claimed is:

1. A pig segment for the active advance of a pig in, in particular, elongate hollow bodies, preferably in gas and oil pipelines, with a drive which comprises at least one motor, at least one crescent-shaped supporting element via which the pig segment can be supported on an inside of the hollow body and at least one carrying element which is movable by the motor along a longitudinal axis of the pig segment, wherein the supporting element is arranged pivotably on the carrying element in order to take up a supporting position and, in the supporting position, a supporting force arises as a function of a force exerted on the carrying element in a direction parallel to said longitudinal axis of the pig segment.

2. The pig segment as claimed in claim 1, the supporting force is proportional to a force which arises via the motor or a load to be moved by the pig segment.

3. The pig segment as claimed in claim 1, wherein at least one force accumulator element pushes the supporting element outward from the longitudinal axis.

4. The pig segment as claimed in claim 1, wherein the supporting element has an outwardly directed surface which includes a plurality of teeth.

5. The pig segment as claimed in claim 1, wherein guide elements are arranged along the longitudinal axis in front of and behind the supporting element.

6. The pig segment as claimed in claim 1, wherein an angle $\beta \leq 90°$ is formed between a straight line drawn from the pivot axis to a possible supporting point and a straight line running from the pivot axis parallel to the direction of movement of the carrying element.

7. The pig segment as claimed in claim 1, wherein the supporting element has a pivot axis and a curved surface, said curved surface extending along a length of the supporting element and directed away from the longitudinal axis and the supporting element, wherein the curvature of the surface varies and defines a plurality of supporting points at a range of radial distances from said pivot axis, said range of radial distances including at least a quarter of the length of the supporting element.

8. The pig segment as claimed in claim 1, comprising at least two opposite supporting elements with respect to the longitudinal axis.

9. The pig segment as claimed in claim 1, wherein the carrying element is arranged centrally in the pig segment.

10. The pig segment as claimed in claim 1, wherein the carrying element is arranged exclusively in a longitudinally movable manner in the pig segment.

11. The pig segment as claimed in claim 1, wherein the carrying element is arranged in the pig so as to be rotatable and longitudinally movable with at least one component in the direction of the longitudinal axis.

12. The pig segment as claimed in claim 11, wherein the disk-shaped carrying element has a plurality of supporting elements arranged along the circumference thereof.

13. The pig segment as claimed in claim 11, comprising two carrying elements, wherein the supporting elements of the two carrying elements are arranged offset with respect to one another in the circumferential direction of the carrying elements in such a manner that said supporting elements pass in an alternating manner into the supporting position with an inside of the hollow body.

14. The pig segment as claimed in claim 1, wherein the carrying element is drivable via a threaded rod which is connected in terms of drive to the motor.

15. The pig segment as claimed in claim 14, wherein a further motor is provided for the simultaneous drive of the threaded rod.

16. The pig segment as claimed in claim 14, wherein the threaded rod is connected to the motor via a gearing.

17. The pig segment as claimed in claim 14, wherein the supporting element is guided via a hollow body in which the motor is arranged.

18. The pig segment as claimed in claim 1, wherein the carrying element is transferrable forward out of a position, in which the supporting element is transferrable into the supporting position, along the longitudinal axis into a freewheeling position, in which the supporting element pivots onto the longitudinal axis.

19. A pig comprising at least one pig segment for the active advance of a pig in, in particular, elongate hollow bodies, preferably in gas and oil pipelines, with a drive which comprises at least one motor, at least one crescent-shaped supporting element via which the pig segment can be supported on an inside of the hollow body and at least one carrying element which is movable by the motor along a longitudinal axis of the pig segment, wherein the supporting element is arranged pivotably on the carrying element in order to take up a supporting position and, in the supporting position, a supporting force arises as a function of a force exerted in the longitudinal direction on the carrying element.

20. The pig as claimed in claim 19, comprising two pig segments, wherein the supporting element of each pig segment is movable alternately of each other by a control device.

21. The pig as claimed in claim 19, comprising two pig segments, wherein the directions of the two pig segments are opposed to each other.

22. The pig as claimed in claim 19, comprising an energy accumulator for the autonomous energy supply of the pig.

* * * * *